United States Patent [19]
Rehage et al.

[11] Patent Number: 4,953,274
[45] Date of Patent: Sep. 4, 1990

[54] MACHINE TOOL WITH TWO WORKPIECE SPINDLES

[75] Inventors: Gerhard Rehage, Gütersloh; Manfred Staege, Melle; Hans W. Grünkemeier, Werther, all of Fed. Rep. of Germany

[73] Assignee: Gildemeiester Aktiengesellschaft, Bielefeld, Fed. Rep. of Germany

[21] Appl. No.: 249,587

[22] Filed: Sep. 26, 1988

[30] Foreign Application Priority Data

Oct. 1, 1987 [DE] Fed. Rep. of Germany ... 8713204[U]

[51] Int. Cl.⁵ .............................................. B23B 3/30
[52] U.S. Cl. ........................................ 29/27 C; 29/36; 82/121; 82/129
[58] Field of Search .......................... 29/27 C, 36, 40; 82/120, 121, 124, 129; 409/201, 211; 408/35, 37

[56] References Cited

U.S. PATENT DOCUMENTS

| | | | |
|---|---|---|---|
| 4,180,894 | 1/1980 | Link | 29/276 X |
| 4,457,193 | 7/1984 | Matthey | 29/36 X |
| 4,719,676 | 1/1988 | Sansone | 29/36 X |

FOREIGN PATENT DOCUMENTS 3514069 10/1985 Fed. Rep. of Germany .

*Primary Examiner*—Z. R. Bilinsky
*Attorney, Agent, or Firm*—Michael J. Striker

[57] ABSTRACT

A machine tool comprises two workpiece spindles having a spindle axis and located axially opposite to one another, at least one of the workpiece spindles being movable in an axial direction for transferring a workpiece from a clamping location to a working location, at least two tool carriages which are movable independently of one another parallel to the spindle axis and perpendicular to the spindle axis, guides arranged at opposite sides of the spindle so that tools of both the tool carriages can work both a workpiece held in one of the tool spindles and a workpiece held in the other of the tool spindles, two revolvers each arranged on a respective one of the tool carriages and provided with a plurality of tool receptacles, one of the two revolvers having a switching axis which extends perpendicular to the spindle axis, while the other of the two revolvers has a switching axis which extends parallel to the spindle axis, and the tool receptacles of the revolvers are formed so that the tools in both two revolvers are arranged on the tool receptacles substantially radially to the switching axes.

4 Claims, 2 Drawing Sheets

MACHINE TOOL WITH TWO WORKPIECE SPINDLES

BACKGROUND OF THE INVENTION

The present invention relates to a machine tool with two workpiece spindles.

More particularly it relates to a machine tool which has two workpiece spindles located opposite to one another with one workpiece spindle axially movable to transfer a workpiece from a clamping device of one spindle to the other spindle, at least two tool carriages which are displaceable independently of one another on guides which extend parallel to the spindle axis and guides which extend perpendicular to the same, and two turrets provided on the tool carriages and having a plurality of tool receptacles.

Machine tools of the above mentioned general type are known in the art. One of such machine tools is disclosed for example in the German document DE-OS 3,514,069. The arrangement of the tool turrets and the tools is selected in this machine so that each turret preferably cooperates with one spindle and the tools are oriented on this spindle. When from the same tool holder the workpiece must also be worked in respective other spindle, special expensive holders are required, which in addition permit only very limited working. The tool holder which faces toward the operational side is supported on short longitudinal guide ways and projects very far, when it works a workpiece in the associated workpiece spindle. Thereby the machine remains accessible in a satisfactory manner; however, the stability of the tool holder suffers a lot, and the working possibilities are thereby very limited.

SUMMARY OF THE INVENTION

Accordingly, it is an object of the present invention to provide a machine tool of the above mentioned general type, which avoids the disadvantages of the prior art.

More particularly, it is an object of the present invention to provide a machine tool of the above mentioned general type, which permits an unlimited working on both spindles with simple tool holders, and also the same tools can be used at both spindles.

In keeping with these objects and with others which will become apparent hereinafter, one feature of the present invention resides, briefly stated, in that a indexing axis of one of the tool turrets extends perpendicular to a spindle axis, and a indexing axis of the other of the two turrets extends parallel to the spindle axis, and the tools of both tool turrets are arranged substantially radially to the switching axes of the tool carriers of the tool turrets.

In accordance with the present invention the tool holders are not associated with a tool spindle, but instead with a working task. The tool turret with the indexing axis extending perpendicular to the tool spindle carries substantially a tool for the inner working. The same tool which is used on the first spindle can be oriented by indexing over 180° of the tool turret with the second spindle and can be used again without any limitations. The tool turret with the indexing axis which extends parallel to the spindle axis preferably carries tools for an outer working, especially tools for transverse drilling, perforating, milling, etc. The tools are brought by displacement of the longitudinal carriage to its point of use from one tool spindle to the other.

The advantage of this arrangement is so far reaching, that the tool of the first turret can be used unchanged on the second turret, when for example an inner working and a transverse drilling must be performed with the same diameter. The number of the tools to be stored for the machine tool is considerably reduced. Especially in the event of relatively expensive driven tools, such economy is of considerable importance for the economical working of a workpiece.

The lengths of the guides which extend parallel to the spindle axis for the tool holders and arranged for the workpiece spindle, make no limitations in the working on both spindles on stability reasons. The accessability of the machine is insured by the arrangement of the guide ways one beneath the other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
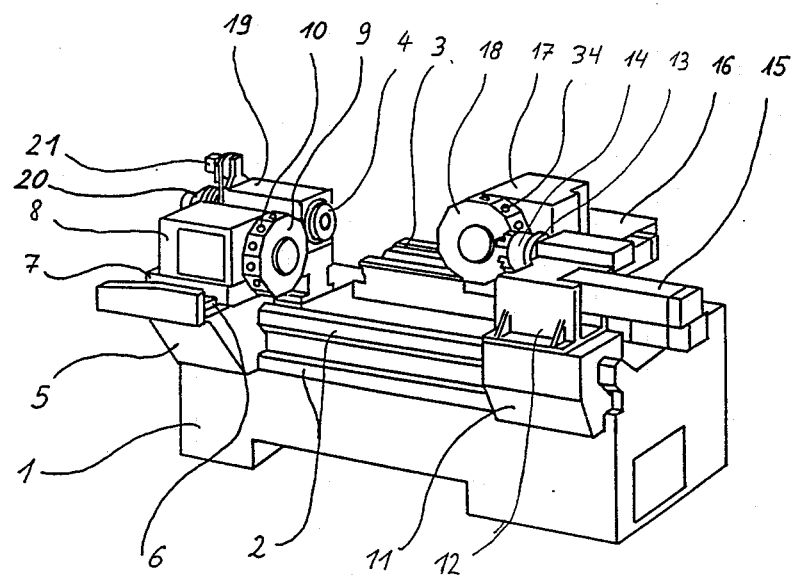
FIG. 1 is a perspective of a machine tool in accordance with the present invention.

A machine tool in accordance with the present invention has a machine bed 1 which is provided with front guide ways 2 and rear guide ways 3 extending parallel to an axis of the main spindle 4.

A first longitudinal carriage 5 is suported on the front guide way 2 and carries guides 6 for a tool carriage 7. The guide 6 extends perpendicularly to the axis of the main spindle. A tool turret 8 is mounted on the tool carriage 7 and has an indexing axis which extends parallel to the axis of the spindle 4. The tool turret is provided with a tool holder 9 which has on its periphery a plurality of tool receiving openings 10.

A further longitudinal carriage 11 is supported on the front guide ways 2 and carry a spindle box 12. A tool spindle 17 is rotatably supported in the spindle box 12 and provided with a clamping chuck 14. The workpiece spindle 13 is driven by a motor 15. The displacement drives for both longitudinal carriages 5 and 11 are not shown in the drawings.

A longitudinal carriage is supported on the rear guide ways 3 and carries a tool carriage 16 which is displaceable transversely to the rear guide ways 3. A tool turret 17 with a tool holder 18 is mounted on the tool carriage 16. The indexing axis of the tool turret 17 extends perpendicularly to the axis of the main spindle.

The main spindle 4 is supported in a stationary spindle box 19 between the front and rear guide ways 2 and 3 relative to the longitudinally displaceable workpiece spindle 13. A spindle drive 20 and a rotary speed counter 21 are located at the rear side of the main spindle 4.

Figure 2:
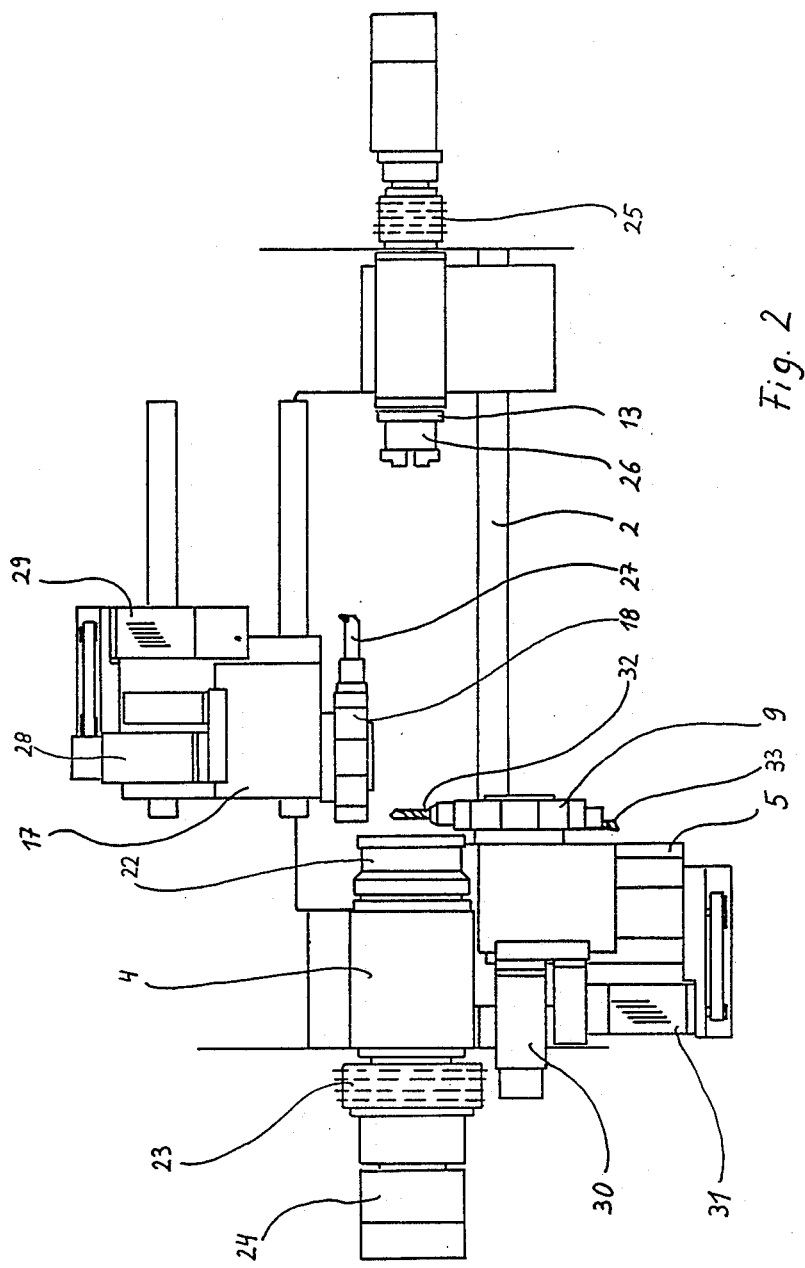
FIG. 2 is a plan view of the inventive machine.

As can be seen from FIG. 2, the main spindle 4 is provided with a clamping jaw chuck 22 and driven through a belt pulley 23. The clamping jaw chuck 22 is actuated by a clamping cylinder 24. The workpiece spindle 13 which is located axially opposite to the main spindle 4 is driven by a motor 15 through a belt pulley 25 and carries a clamping chuck 26 on its side which faces toward the main spindle 4.

In the tool holder 18 of the turret head 17, for example a drilling rod 27 is inserted. The tool holder 18 is turned by the motor 28 over a predetermined angular distance. In addition to the turret head 17, a displacement drive 29 for the movement of the tool holder 18 transversely to the axis of the spindle is provided. The second tool holder 9 also has, similarly to the tool holder 18, a turning drive 30 and is movable by a displacement motor 31 transversely to the axis of the spindle. A rotatably driven drilling tool 32 and a rotary bit 33 are inserted in the tool holder 9.

The tool holder 9 can be displaced by means of the longitudinal carriage 5 on its guide ways 2 from the working region of the main spindle 4. As can be seen from FIG. 2, the non-changeable tool 32, 33 of the tool holder 9 act on the workpiece which is held by the main spindle 4 and also on the workpiece which is carried by the workpiece spindle 13.

The tool 27 of the tool holder 18 faces toward the workpiece spindle 13 and performs an inner working on a workpiece which is held by the workpiece spindle 13. For bringing the tool 27 on the main spindle 4 for its use, the tool holder 18 must be turned by 180°. After this the tool 27 becomes ready for an inner working of the workpiece which is held in the main spindle 4.

The same tools can also work not only in unchangeable manner on both spindles 4 and 13. They also can be exchanged between both tool holders 9 and 18 when the tool receiving openings 8 and 34 and the mounting elements are formed identically.

It will be understood that each of the elements described above, or two or more together, may also find a useful application in other types of constructions differing from the types described above.

While the invention has been illustrated and described as embodied in a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A machine tool, comprising two workpiece spindles having a common spindle axis and located axially opposite to one another, at least one of said workpiece spindles being movable in an axial direction for transferring a workpiece from a clamping location to a working location; at least two tool carriages; guide means for supporting each of said at least two carriage for movement parallel to the spindle axis and perpendicular to the spindle axis, a first tool turret supported on one of said at least two carriages and having a first indexing axis extending perpendicular to the spindle axis; and a second tool turret supported on another of said at least two carriages and having a second indexing axis extending parallel to the spindle axis and perpendicular to said first indexing axis, each of said first and second turrets having a plurality of tool receptacles formed so that tools received in said tool receptacles extend substantially radially to a respective one of said first and second indexing axes.

2. A machine tool as defined in claim 1, wherein each of said first and second turrets has an outer circumference, said plurality of tool receptacles being provided on said outer circumference.

3. A machine tool as defined in claim 1, wherein tool receptacles of said first turret are identical to tool receptacles of said second turret.

4. A machine tool as defined in claim 1, wherein said guide means includes separate guides arranged on opposite sides of the spindle axis and extending parallel thereto to enable working of a workpiece held in each of said two spindles with tools carried by each of said first and second turrets.

* * * * *